United States Patent Office 3,783,128
Patented Jan. 1, 1974

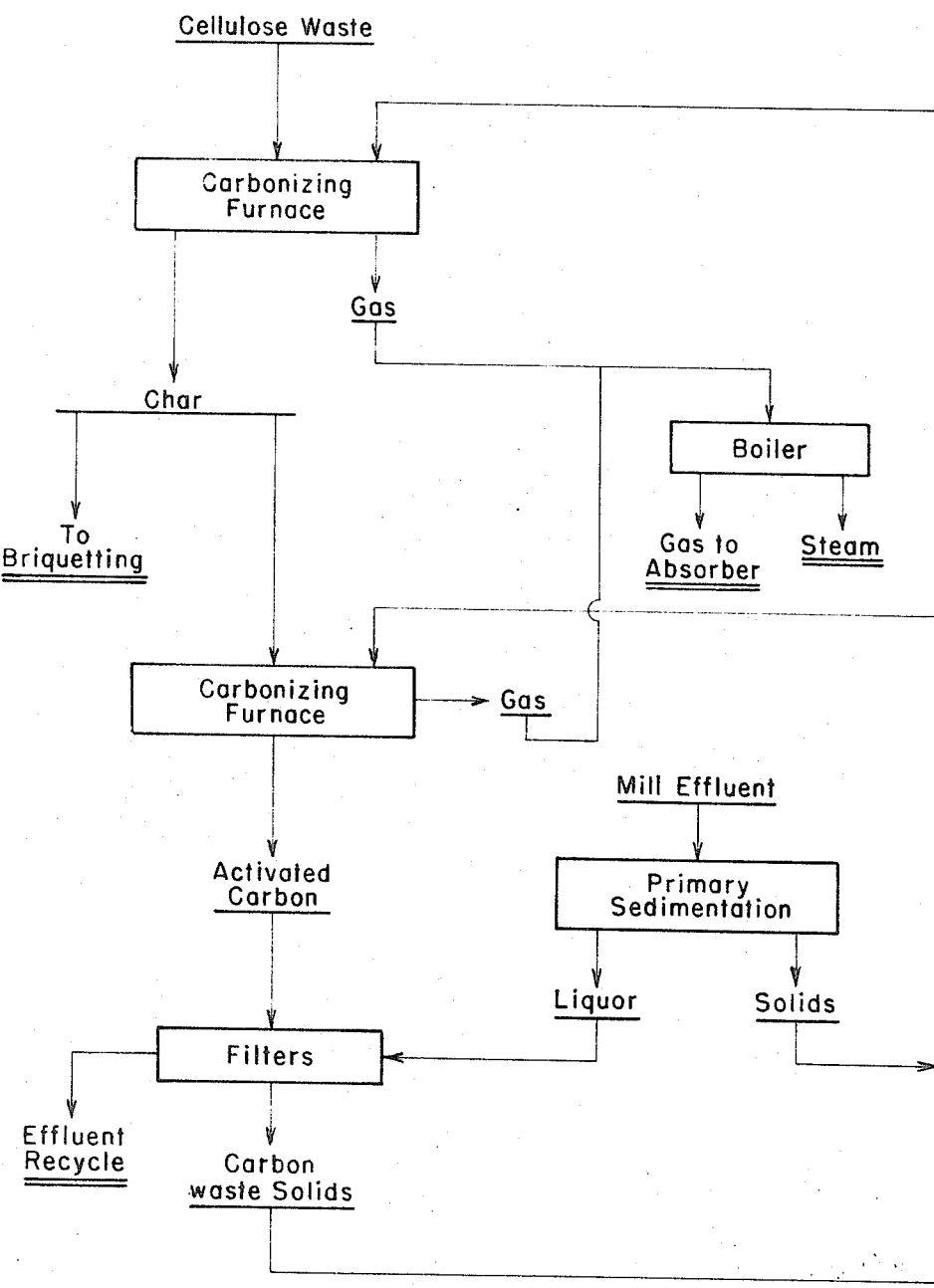

3,783,128
PROCESS FOR RECOVERING FOREST
PRODUCT PLANT WASTES
Robert E. S. Thompson, R.D. 3, Sachems Head,
Guilford, Conn. 06437
Filed Apr. 26, 1972, Ser. No. 247,582
Int. Cl. B01d 15/06
U.S. Cl. 210—27                                    7 Claims

ABSTRACT OF THE DISCLOSURE

A process for the closed-circuit processing of all waste products from forest product plants, without air or water pollution. Solid wastes, typically bark, wood chips, sawdust or the like, are carbonized to a char. The char is at least in part treated in a second furnace to produce activated carbon, char not so treated being briquetted and sold. The activated carbon is used as a filter medium for plant effluent liquors, which can be recycled after solids removal. The carbon and entrained solids are returned to one of the furnaces. Off-gas from all furnaces is passed to a boiler for steam generation, the spent gas being passed through an absorber, if necessary, before release.

BACKGROUND OF THE INVENTION

The present invention relates generally to the treatment of cellulosic waste materials and, more particularly, it relates to the economic treatment of all mill wastes in a closed circuit system which may be economically self-sustaining.

The forest products industry in general and the paper producers in particular are faced at this time with operating problems of such a nature that many companies have decided to close mills down rather than continue operations. Perhaps the most pressing problems result from federal and state laws regarding air and water pollution. As these laws come into effect in state after state, companies are faced with the choice of spending millions of dollars for pollution control equipment or closing down a mill. In many instances, particularly in the case of older mills, companies have chosen the latter course.

A second problem faced by mill operators is rising power costs which, in most instances, is fuel cost: coal, natural gas or whatever. Indications at present indicate that energy costs will rise even higher, and rise very substantially, in the future.

A further problem faced by many mill operators who are trying to cope with pollution is one of limited space. Mills are most often located on bodies of water which serves as a processing material and as a means of transporting raw materials and/or products. Rail lines frequently confine a mill on the side away from the shore. Thus, if an operator needs the substantial land area required for conventional primary and secondary water treatment facilities, he finds there is no room immediately adjacent the mill and he is faced with the additional expense, both capital and operating, of transporting large volumnes of effluent water substantial distances to the treatment plant.

Pollution problems of pulp and paper mills and other forest products plants vary greatly depending on raw materials, processes employed and desired products. Unfortunately, much of the anti-pollution equipment heretofore installed has been in response to a particular law and has only resulted in a trade-off of one form of pollution for another.

Air pollution by mills is perhaps the most visible form of pollution, the presence of a mill being noticeable many miles away by both noxious odors and particulate material. Scrubbers, absorbers and precipitators can reduce or eliminate air pollution, but often this is at the expense of water pollution.

The discharge of untreated mill effluents directly into adjoining waterways is now banned in most localities and most assuredly will be so in the future, at least in the U.S. The creation of huge settling ponds for primary treatment is both expensive and subject to the logistical problems noted above, i.e. where to put them. Secondary and even tertiary treatment adds enormously to cost. In terms of expense, meeting water pollution standards is without doubt the most pressing problem faced by mill operators.

A third form of pollution has received much less attention, and this is the posioning of ground waters by percolation of rain through huge piles of solid waste. Such waste may include common materials like bark, chips, sawdust or the like, or more exotic materials like coffee bean hulls or peanut shells. Such materials are often burned, but this merely results in trading-off ground pollution for air pollution.

Thus, solutions are available for all the various forms of pollution, but they are individually and collectively expensive, they produce little or nothing of value, and they consume valuable space. It is noted that many processes exist for recovering valuable chemicals from effluent liquors, but these processes also produce an effluent which is generally only slightly less of a pollution problem than the original liquor. What is needed and has been lacking is an integrated approach, one that will eliminate all forms of pollution, and not merely trade-off one for another. If such an approach had the additional advantage of paying for itself, a major industry problem will be solved.

OBJECTS OF THE INVENTION

It is a general object of the present invention to provide a closed circuit system for treating all forest product waste materials which avoids pollution of any kind.

Another object of the present invention is to provide an integrated waste treatment process for cellulosic materials which requires less land and less capital investment than comparable conventional processes.

A further object of the present invention is to provide an integrated waste treatment process for cellulosic waste which produces by-products of signicant value.

Still another object of the present invention is to provide an integrated waste treatment process for cellulosic waste which is adaptable for use in substantially any forest products treatment plant.

Various other objects and advantages of the invention will become clear from the following description of embodiments thereof, and the novel features will be particularly pointed out in connection with the appended claims.

THE DRAWING

Reference will hereinafter be made to the accompanying drawing, which is a simplified schematic flow sheet or flow diagram illustrating an embodiment of the invention.

SUMMARY AND DESCRIPTION OF EMBODIMENTS

In essence, the present invention is based on the concept that solid cellulosic waste can be carbonized and, in a second stage, the charcoal produced can be formed into activated carbon. The activated carbon is then used as a filtration medium for liquid cellulosic waste which, when it becomes loaded, is recycled to the carbonizing step. Charcoal in excess of that required for filtration purposes is formed into briquettes for sale. Off-gases from both the carbonizing and activated carbon furnaces are used to power a boiler to generate steam. The spent gases issuing from the boiler are cleaned, if necessary, by absorption in the filtrate, which is reconstituted and recycled to the plant. Alternatively, the gases may also be filtered through activated carbon.

It is to be emphasized that differing forest product treatment plants produce greatly varying quantities of solid and liquid cellulosic wastes, and that application of the present invention to an individual plant will require its adaptation to specific circumstances. However, the basic principle remains the same: conversion of solid waste to activated carbon, utilization of the latter material as a filtration medium for liquid waste, and recovery of heat from the furnaces in the form of steam.

The formation of charcoal from wood products goes back many hundreds of years, and involves merely the combustion of same in the presence of limited air. Commonly, a heap of raw material is ignited near its center and the pile allowed to burn from the inside out, generally over a period of days. Such a method includes no heat or distillate recovery. Retorts have also been employed for carbonizing, but the limited batch size makes their use impractical for large scale operations. While the present invention is not limited to any specific type of carbonizing apparatus, the preferred mode of carrying out this step is in a multiple hearth roaster. Such roasters are commonly employed in the treatment of sulfide ores as well as other materials. Essentially, the raw material is charged to the top-most of a series of vertically-arranged, circular earths. Rabble arms rotated by a central vertical shaft move the charge material either inwardly or outwardly in a spiral fashion until it reaches an opening where it drops down to the hearth below. Eventually, the charcoal is discharged from the bottom hearth. Combustion gases and gaseous combustion products flow countercurrent to the solids, and are removed into a gas off-take at the top. Such roasters are well known and need not be described in detail. Their advantages, insofar as the present invention is concerned, are chiefly in their flexibility of operation. Thus, the top hearth or hearths, where temperatures are lowest, may be used, as driers for wet materials. This is important for wastes which have been stored in the open. Further, combustion ratios and temperatures from hearth-to-hearth are easily controlled and a charcoal product containing a desired residual volatile content is readily produced. Perhaps most important, the multiple hearth roaster is a continuous production device well adapted to handle many tons per hour of raw material in extended campaigns.

Depending on the relative demand for activated carbon filter media, charcoal briquettees and steam, the roaster will be operated to remove more or less of the volatile content of the raw material.

The production of charcoal briquettes from the resulting char is entirely done with conventional technology which need not be discussed herein. However, it is to be noted that the organic binders utilized in such processes may include other waste treatment by-products or condensates (tars, oils and/or higher boiling fractions), such as are obtained in many black liquor recovery processes. Production of charcoal briquettes will not be favored, in most instances, because of transportation costs incurred in getting a relatively low-value product to market, frequently a long distance. Of more importance, generally, is the production of ample activated carbon for use as filtration medium.

Activated carbon is produced by combusting essentially all of the volatile content of the raw material. To obtain activated carbon which is a good filter medium, various alternative procedures may be employed, depending essentially on the character of the solid cellulosic waste which forms the raw material. Obviously, bark, wood chips and coffee bean hulls will produce very different charcoals and carbons, in terms of physical characteristics. For example, a powdery material will manifestly not form a suitable filtration bed, so a powdery charcoal should be agglomerated prior to charging into the second furnace. Again, other in-process residues and condensates may be employed in the agglomeration step. The object in view is to produce an activated carbon granule of proper size that has the fine-grained porous structure required of a good filtration medium and the structural strength required to resist crushing under conditions of use. Proper operating conditions will vary for each raw material (or significant changes in the raw material mix) and must be determined for each operation. While a multiple hearth roaster is also preferred for the activated carbon furnace, other devices may also be employed (kilns, coking furnaces, etc.).

Effluent liquors from wood treating mills vary enormously in their chemical composition, solids content and even temperature, depending on the process being employed. For example, a kraft black liquor may have 55% (by weight) solids, of which 7% is sodium carbonate, 4% is sodium sulfite, a faction of a percent is sodium sulfate, and the remainder is organic carbon. On the other hand, water employed for heating or cooling is only a thermal pollution problem, but may contain a variety of lighter contaminants. Many plants employ multiple effect evaporators or like equipment to increase liquor concentration before any type of recovery operation. While not incompatable with the present invention, it is felt that such measures are inherently expensive in their own right and also increase demand for make-up water, which should be avoided if possible. (It is noted that such evaporation is required if one is going to spray the liquor directly into a boiler to recover a chemical-bearing smelt and sensible heat. There is no need for such measures in the present invention.) In accordance with the present invention, the effluents may be treated individually or in a mixed stream and are subjected, preferably, to only a primary sedimentation step prior to filtration with activated carbon. This removes gross solids which would otherwise quickly blind the filtration medium. As pointed out hereinbelow, however, it is of no great importance if the beds become saturated relatively quickly.

In general, the activated carbon filtration is carried out in a plurality of towers packed with the filtration medium, an excess of towers being provided so that some towers may be "down" for draining, unloading and reloading while the others are on stream, without affecting the volume capabilities of the system. With some effluents, one-through a tower will be sufficient, and the towers on stream will be run in parallel. In other systems, a plurality of towers will be required and they will be run in series, with the tower having the freshest filter as the last tower in the system. Both the construction and operation of the towers will vary to a substantial degree depending on the physical characteristics of the activated carbon. For example, a strong, coarse carbon could be packed in a single bed with an adequate flow rate. Weaker carbon would require a plurality of independently supported beds in each tower.

The main product extracted from the effluent stream is organic carbon in various forms, all of which is suitable for recycling to the carbonizing furnace. Rather than flush the tower, it is preferred to merely drain it when it becomes saturated and transfer the contents to the furnace, including the original activated carbon charge. In some systems, where the recycled material contains volatile or corrosive compounds, it may be desirable to dry and preheat the charge before passing it to the main carbonizing furnace, thus permitting independent handling and recovery of such compounds away from the main process stream.

The feed for the activated carbon filters is the overflow from the primary sedimentation tanks. Underflow from these tanks will be a sludge which should be dewatered and then passed to the carbonizing furnace directly or to a separate preheater, as noted above, depending on its content.

It is the intent of the invention that the effluent after filtration be recycled for in-plant use by reconstituting it for the desired purpose. However, it is to be noted that effluent filtered by activated carbon in accordance with the invention should have a biological oxygen demand (or B.O.D.) that will render it safe for discharge if that is desired.

The off-gases from the carbonizing furnace and the activated carbon furnace (and a preheater if used) all pass to a boiler where they are completely combusted, the effluent gases consisting mainly of $CO_2$. Either low-pressure of high-pressure steam may be generated, depending on whether process steam or electric power is desired. Construction and operation of such boilers is well known and need not be described in detail herein.

If any of the effluents being treated contain even small amounts of sulfur-bearing compounds, the boiler stack gases will contain $SO_2$ which must be recovered before the gases can be released. Conversion to acid or elemental sulfur is generally not practical, and the easiest method is to absorb the $SO_2$ in the recycled effluent, in part reconstituting it for reuse in the plant. Alternatively, the stack gases may also be filtered through an activated carbon bed.

It is to be emphasized that the method of the present invention is entirely compatible with present waste recovery technology, and those skilled in the art will appreciate how this may be done. Thus, the dewatered sludge may contain valuable chemicals that can be recovered prior to carbonizing. In certain instances it may be desirable to treat certain effluents completely independently before treatment in accordance with the invention.

While it is believed that the method of the present invention is more economical than recovery methods heretofore put into use, it will be economically self-supporting only when the power produced, whether it be steam or electric, replaces a relatively high cost fuel or energy. The economics of the present invention are more accurately characterized by comparing both construction and operating costs (and land use) of the invention with comparable processes which eliminate land, air and water pollution.

Various changes in the details, materials, steps and arrangements of parts, which have been herein described and illustrated in order to explain the nature of the invention, may be made by those skilled in the art within the principle and scope of the invention as defined in the appended claims.

What is claimed is:

1. Process for the closed circuit treatment of solid cellulosic waste material and a liquid waste material containing entrained solid cellulosic waste comprising:
    subjecting said liquid waste to a primary sedimentation to produce an overflow liquid and a wet sludge;
    dewatering said wet sludge;
    carbonizing said solid cellulosic waste materials, said wet sludge and recycled filter material to form charcoal and a heated off-gas;
    further carbonizing at least a portion of said charcoal to form activated carbon and additional heated off-gas;
    forming a filter bed of said activated carbon and filtering therethrough said overflow liquid to remove remaining entrained solids;
    recycling said filter bed and entrained solids to said carbonizing steps and
    combusting said off-gases in a boiler for steam generation.

2. The process as claimed in claim 1, wherein said carbonizing step is carried out in a multiple hearth roaster.

3. The process as claimed in claim 1, wherein the portion of charcoal not formed into activated carbon is briquetted.

4. The process as claimed in claim 1, wherein said filtration is carried out in a plurality of filtration beds.

5. The process as claimed in claim 1, wherein said filter bed and entrained solids are dried and preheated prior to said recycling.

6. The process as claimed in claim 1, and additionally comprising scrubbing the effluent gases from said boiler to remove any contained sulfur dioxide.

7. The process as claimed in claim 6, wherein said scrubbing is effected by absorption in said filtered liquid.

References Cited
UNITED STATES PATENTS

| | | | |
|---|---|---|---|
| 3,244,621 | 4/1966 | Bouthilet | 210—33 X |
| 2,166,225 | 7/1939 | Twining | 252—421 |
| 2,362,463 | 11/1944 | Boehm et al. | 252—421 |
| 3,545,619 | 12/1970 | Ettlich et al. | 210—265 X |
| 3,511,027 | 5/1970 | Roberts et al. | 55—73 X |
| 402,224 | 4/1889 | Blessing | 210—335 X |

JOHN ADEE, Primary Examiner

I. CINTINS, Assistant Examiner

U.S. Cl. X.R.

162—30; 210—39, 71, 73; 252—421; 55—73